United States Patent [19]

Dayton

[11] 4,233,629
[45] Nov. 11, 1980

[54] SYNC SEPARATOR WITH A LOOK-AHEAD CLAMP

[75] Inventor: Birney D. Dayton, Nevada City, Calif.

[73] Assignee: The Grass Valley Group, Grass Valley, Calif.

[21] Appl. No.: 9,194

[22] Filed: Feb. 5, 1979

[51] Int. Cl.³ .............................................. H04N 5/08
[52] U.S. Cl. .................................................. 358/153
[58] Field of Search ...................... 358/17, 19, 20, 153, 358/167, 155–157; 328/139

[56] References Cited

U.S. PATENT DOCUMENTS

| | | | |
|---|---|---|---|
| 3,876,828 | 4/1975 | Cook | 358/153 |
| 4,064,541 | 12/1977 | Schneider et al. | 358/153 |
| 4,081,833 | 3/1978 | Akiyama | 358/153 |

Primary Examiner—Raymond F. Cardillo, Jr.
Assistant Examiner—Aristotelis M. Psitos
Attorney, Agent, or Firm—William D. Haffner

[57] ABSTRACT

An apparatus and method for precise separation of synchronizing information from a color television signal is described. Synchronizing signals are separated from the input video and used in a sample-and-hold circuit as the sampling pulses. The input video is sampled during the duration of the sync pulse. The sample is inverted and fed to a summing point where it is summed with a delayed version of the input video. A null is produced at the summing point during the duration of the input sync pulse. Since the input video to summing point has been delayed, the clamp null at the summing point begins during the front porch of the horizontal line interval allowing the leading edge of sync to be picked off very accurately by a sync separating comparator.

23 Claims, 6 Drawing Figures

SYNC SEPARATOR WITH A LOOK-AHEAD CLAMP

BACKGROUND OF THE INVENTION

This invention relates to television synchronizing signal separating circuits.

A composite color television video signal is composed of a video signal and synchronizing signals such as a horizontal synchronizing signal and a vertical synchronizing signal. These synchronizing signals are collectively referred to as the sync signal. A sync separator is employed a clip the sync signals from the composite video signal. These sync signals are then utilized for synchronizing horizontal and vertical scanning with the video signal.

The sync signals are susceptible to various types of noise and distortions. Various schemes have been developed to alleviate these problems. For example, U.S. Pat. No. 4,081,833 described a sync separator which contains circuitry to eliminate hum and peak and pedestal level variations. Another type of distortion that is of concern is time-base distortion caused by hum and tilt on the composite video signal. If the composite video signal is riding on a low frequency hum signal, the leading edge of the sync signal will vary from line to line and the sync separator will be unable to accurately pick off the leading edge of sync.

SUMMARY OF THE INVENTION

In a sync separator according to the present invention, the sync signal is separated from the incoming composite video signal by a first sync separator. This separation need not be precise. The separated sync signal is fed to a sample-and-hold circuit as the sampling pulse. The sample-and-hold circuit samples the incoming video during sync time, holds it and feeds its, via an inverter, to a summing point. The incoming video is delayed and also fed to the summing point. The gains of the delayed video path and the inverted sample path are precisely matched in order to generate a null at the summing point during the sync time of the incoming video. Since the video input to the summing point has been delayed, the clamp null starts during the front porch of the sync signal thus allowing the leading edge of the sync signal to be picked off very accurately by a sync separating comparator. Hum and tilt distortion are reduced by a factor of approximately 60 to 1, because the distortion has only 1 microsecond to accumulate rather than approximately 60 microseconds as when the last sample before the leading edge of sync is taken on the previous horizontal line.

It is therefore an object of the present invention to separate synchronizing information from a television signal with minimal time base distortion.

It is another object of the present invention to provide a sync separator which minimizes the effects of hum and tilt in the incoming video signal upon the separated sync signal.

Other objects and advantages will become apparent to those having ordinary skill in the art upon a reading of the following description when taken in conjunction with the accompanying drawing figures.

DETAILED DESCRIPTION OF THE PREFERRED EMBODIMENT

Figure 1:
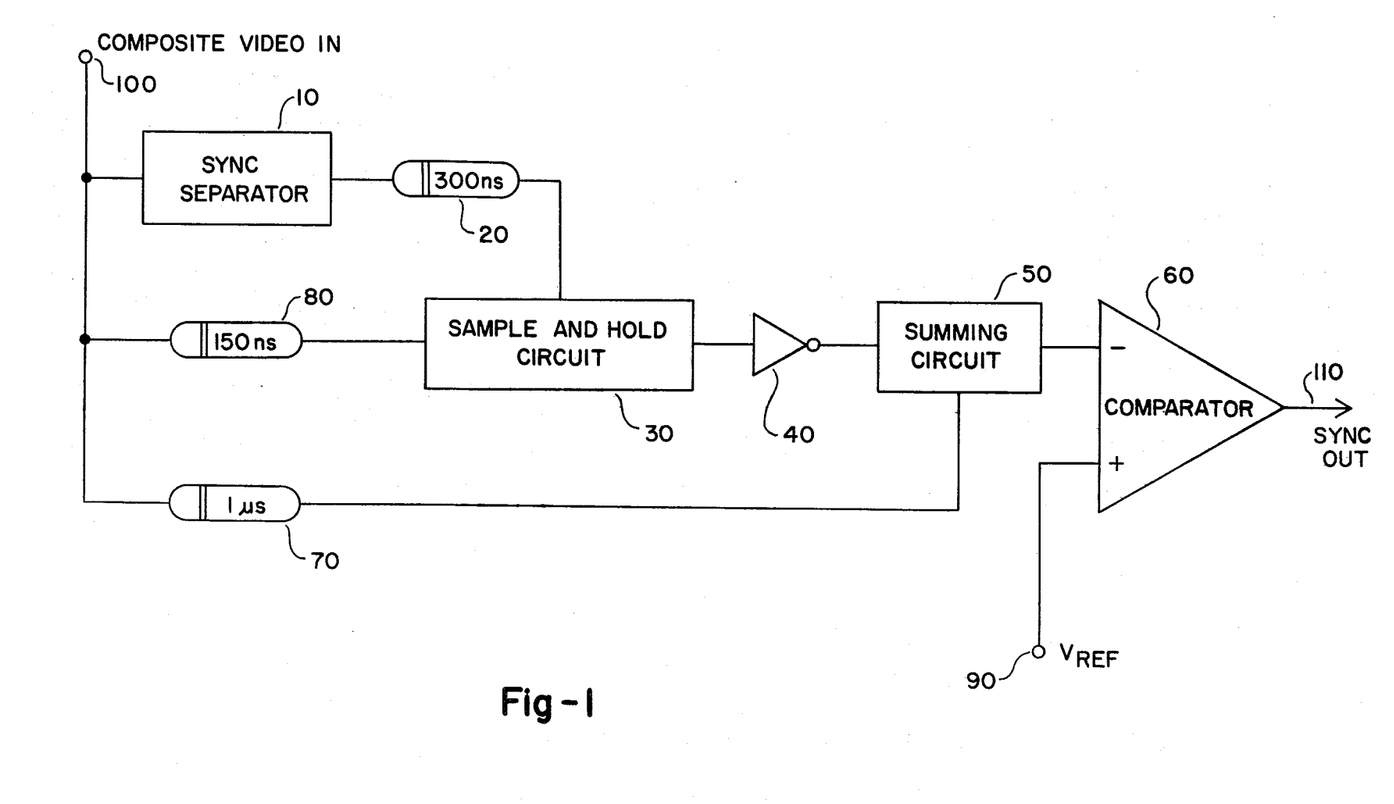
FIG. 1. is a block diagram of a sync separator according to the present invention.

In order to best understand the present invention refer to FIG. 1 wherein is shown a block diagram of the sync separator. Composite video enters conventional sync separator 10, via input terminal 100. The sync separator is connected to delay 20 which delays the leading edge of the sync pulse. This delayed pulse is then routed to sample and hold circuit 30 where it is used as a control pulse. The input signal to the sample and hold circuit is the composite video signal after it has passed through delay 80. The sampled video output of the sample and hold circuit is connected to inverter 40 whose output is one input to summing circuit 50. The other input to the summing circuit is the composite video signal after it has passed through delay 70. The output of the summing circuit is one input to comparator 60 while the other input is a reference voltage from terminal 90. The output of the comparator or line 110 is the accurately separated sync signal.

Figure 2:
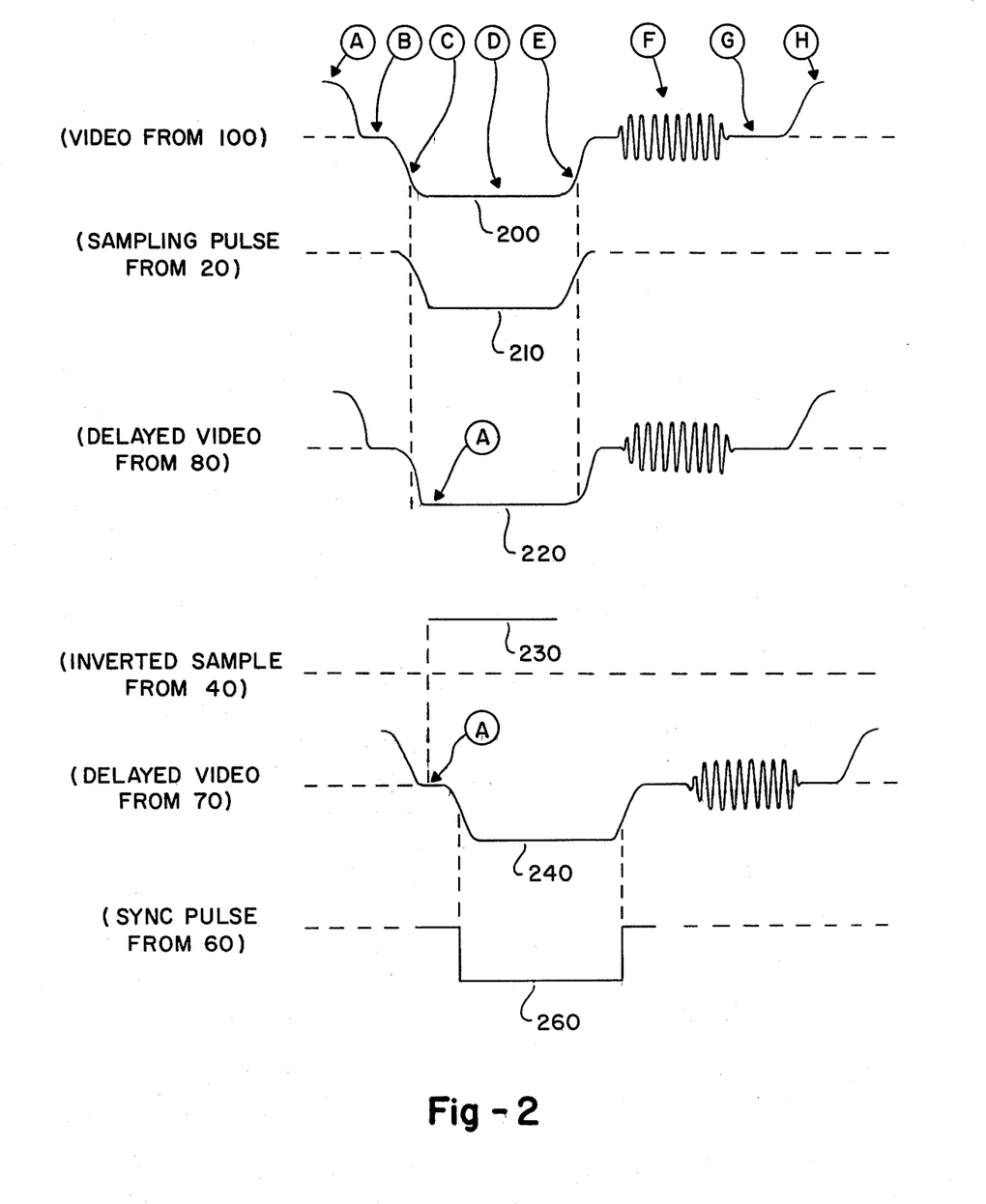
FIG. 2 depicts waveforms a various points throughout the block diagram of FIG. 1.

Circuit operation may best be understood with reference to FIG. 2 wherein the various signals involved are depicted as they might be seen on an oscilloscope display. Composite video (only the horizontal scanning interval is shown) represented as trace 200 in FIG. 2, enters the circuit at the input terminal and is fed to the sync separator. In trace 200: A represents video voltages at the right side of the picture; B represents the front porch of the horizontal line interval; C represents the leading edge of sync; D represents the sync tip; E represents the trailing edge of sync; F represents the color burst present in color broadcasts; G represents the back porch of the horizontal line interval; and H represents video voltages at the left side of the picture. The first sync separator, as previously mentioned, is of the conventional type such as those described in Television Waveform Processing Circuits by Gerald A. Eastman copyright 1968, Tektronix, Inc. The sync separator separates the sync pulses from the picture information in the usual manner and then the leading edge of the separated sync pulse is delayed 300 nanoseconds by delay 20. This delayed sync pulse is used as the control pulse, shown as trace 210 in FIG. 2, for the sample-and-hold circuit. The sample-and-hold circuit can be any commercial type that has a signal input, and output, and a control input. It has two steady-state operating modes: Sample, in which it acquires that input signal and tracks it until commanded to Hold, at which time it retains the last value of input signal that it had at the time the control signal called for a mode change. In the present invention the delayed separated sync pulse 210, is the control signal to the sample-and-hold circuit. The input signal is the composite video from input terminal 100 which has been delayed 150 nanoseconds by delay 80. This delayed video is depicted by trace 220. A sample of the delayed composite video signal is taken on the falling edge of the control pulse. Because the leading edge of the separated sync pulse used as the control pulse has been delayed 300 nanoseconds by delay 20, and the entire composite video signal being sampled has been delayed only 150 nanoseconds by delay 80, the sample will be taken during the flat tip of the sync pulse, point A of trace 220 Sampling only during the tip of the sync pulse minimizes clamping distortion which may occur if the sample pulse were taken during a rising or falling edge of the sync pulse. The sample is held until the control pulse goes positive. It then passes through the inverter. The inverted sample is depicted in FIG. 2 as trace 230. The inverted sample of the delayed video signal 220 is combined with the video signal 240 which has been delayed 1 microsecond in delay 70. Since video 240 has been delayed 1 microsecond and the sample from the sampling circuit has only been delayed by 300 nanoseconds, the clampling action begins during the front porch of the delayed video, point A of trace 240. Consequently, the leading edge of the sync pulse at the output of the summing circuit will be stable, regardless of any hum on the input video signal. This results because the clamping level only has approximately 1 microsecond to change whereas with prior art sync separators this level has approximately 64 microseconds or one horizontal line to change. Consequently, sync tip tilt due to hum does not have sufficient time to develop.

The clamped video signal is fed to the comparator where it is compared to a reference signal which may be equal to any point on the sync pulse. The 50 percent point or average amplitude is normally used. The output signal resulting from this comparison is then the sync signal 260 separated from the video.

Figure 3:
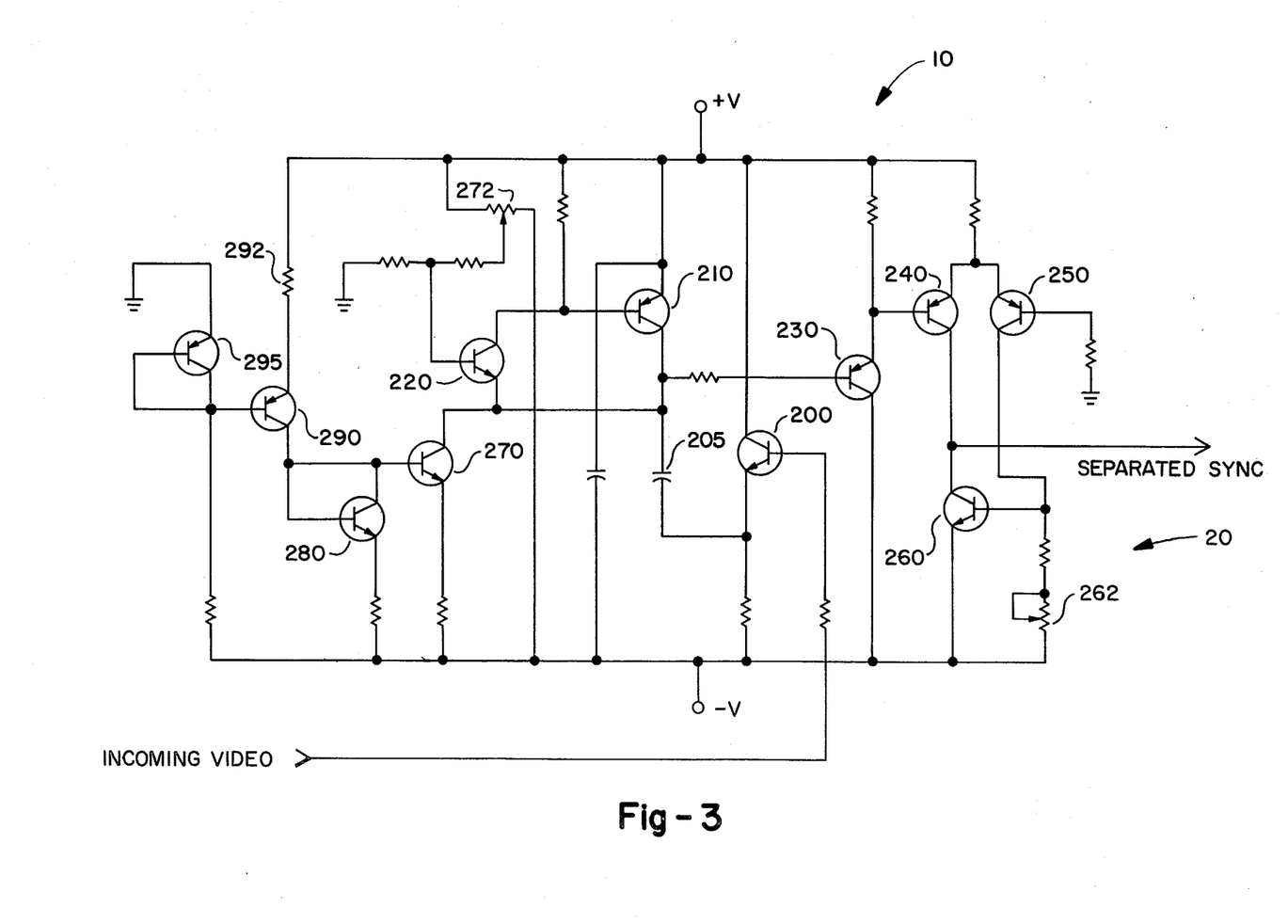
FIG. 3 is a schematic of sync separator 10 of FIG. 1.

Shown in FIG. 3 is a schematic of a first sync separator 10 used in an embodiment of the present invention. Also shown in FIG. 3 is delay 20. As mentioned previously, sync separator 10 is a conventional and a detailed description will not be provided here. The incoming video signal enters the sync separator via buffer emitter follower 200 and is fed to the clamping diode formed by diode-connected transistor 220 and feedback transistor 210. These two transistors function as an extremely square cornered clamping diode. The initial current for capacitor 205 is provided by resistor 292 through level shifter 290 and the current mirror current source comprised of transistors 270 and 280. The clamped signal is then buffered by emitter follower transistor 230. The signal at the emitter of transistor 230 is sync-tip clamped with the sync tip very nearly at ground. The actual dc value of the sync tip is adjustable over a small range via potentiometer 272 to accomodate any offset error in transistors 240 and 250. At startup, the dc voltage on the base of transistor 250 is at ground and poetntiometer 272 is set so that the negative tip of the sync pulse just turns on transistor 240. Therefore, a separated sync output is produced at the collector of transistor 240 and the collector of transistor 260. Potentiometer 262 allows adjustment of the stored charge removal from transistor 260 and thereby provides a delay of the leading edge of the sync pulse. This is normally set to cause a 300 nanosecond delay.

Figure 4:
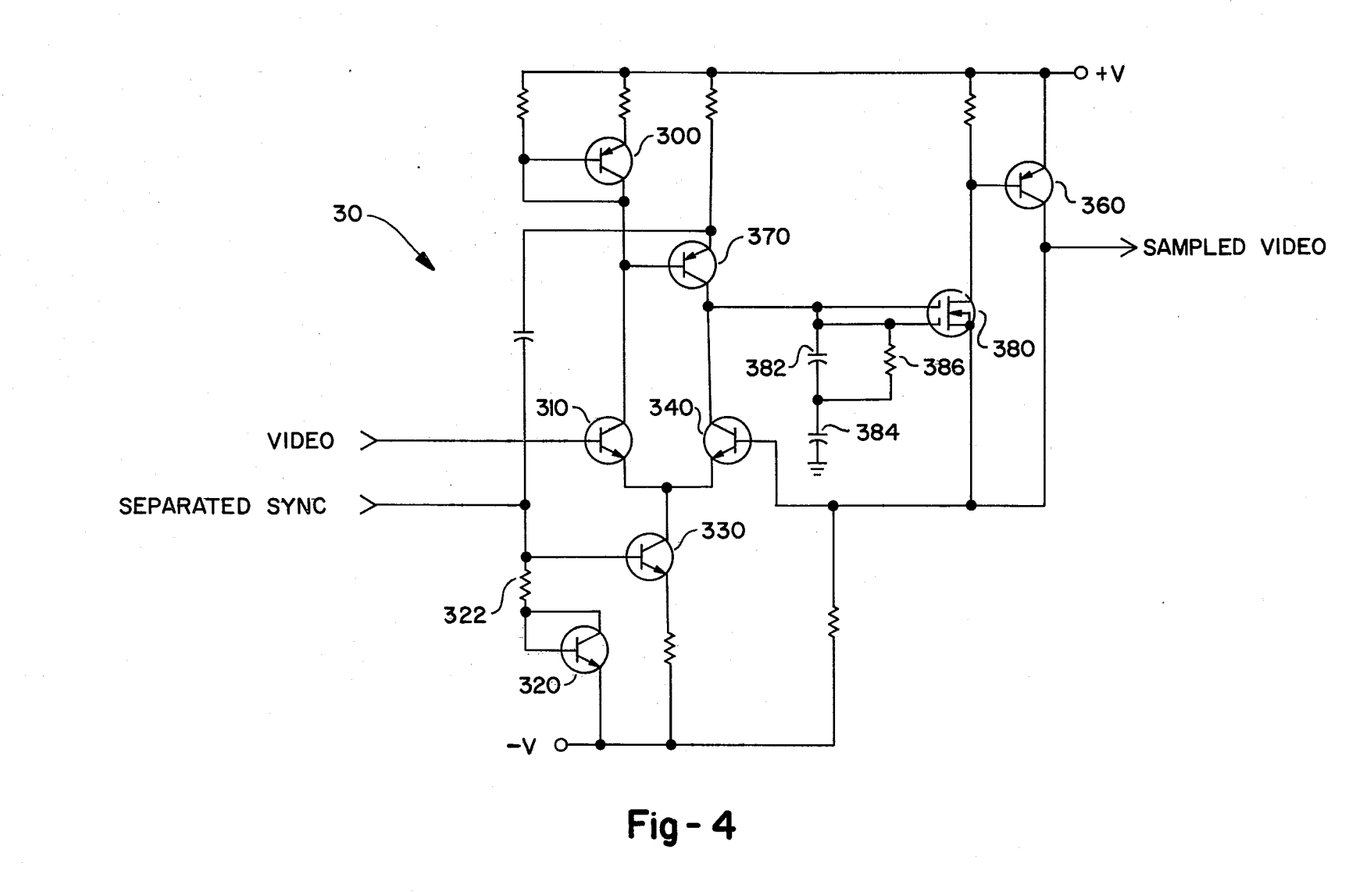
FIG. 4 is a schematic of sample-and-hold circuit 30 of FIG. 1.

The separated sync signal then goes to sample-and-hold circuit 30 which is shown in schematic form in FIG. 4. The video signal enters this circuit at the base of transistor 310. Diode-connected transistor 320 and resistor 322 provide the pullup load for the sync separating transistors 240 and 250 of FIG. 3. Transistor 330, which receives the separated sync signal, is a current mirror for current from the sync separator. During sync time, a 1 milliampere current is fed to the emitters of the differential transistor pair 310/340. The output of the differential pair is fed to the current mirror comprised of transistor 300 and transistor 370. The output of this circuit then goes to the integrating hold circuit comprised of dual-gate FET 380, capacitors 382 and 384, and resistor 386. The sampled video output is taken at the collector of buffer transistor 360.

The video signal being sampled by this circuit has been previously delayed by 150 nanoseconds as it passed through delay 80 of FIG. 1. Since the leading edge of the sync signal has been delayed 300 nanoseconds by transistor 260 and the entire video signal being sampled has been delayed only 150 nanoseconds, the sample will occur on the flat tip of the sync pulse and not during a leading or trailing edge.

The sampled video is fed to summing circuit 50 where it is combined with the incoming video signal. The incoming video signal is delayed 1 microsecond by delay 70. The summing and delay circuits are shown schematically in FIG. 5. The sampled video is fed to the inverting input of differential amplifier 502 and the delayed video signal is fed to the noninverting input of the differential amplifier. Potentiometer 504 is adjusted to precisely null any hum signals that may be present at the output of the differential amplifier. Since the video input to differential amplifier 502 is delayed by 1 microsecond and the sample from the sample-and-hold circuit is delayed by only 300 nanoseconds, the clamp null which results when there signals are summed begins during the front porch of the video signal. Thus, the leading edge of the sync signal will be stable, independent of high or low frequency hum.

Figure 5:
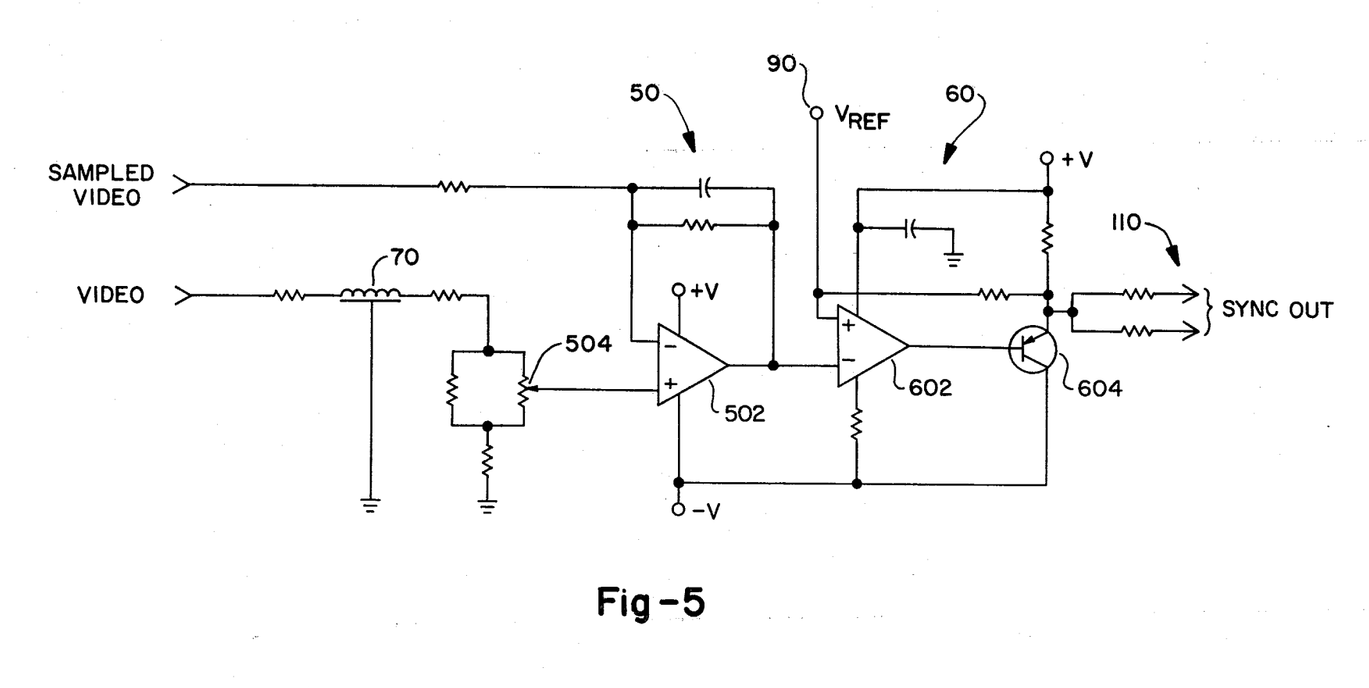
FIG. 5 is a schematic of summing circuit 50 and comparator 60 of FIG. 1.

The clamped signal now enters the inverting input of the sync separating comparator 602. The other input to comparator 602 is a dc voltage level which defines the amplitude at which sync is picked off the clamped video signal. The dc voltage level would normally be established at 50 percent of the amplitude of the sync pulse at the input to the comparator. Fifty-percent sync tracking is well established in the art and is identified for completeness only. Fifty-percent sync tracking may be accomplished by a circuit which tracks the blanking level at the output of differential amplifier 502 and a precision voltage divider.

The accurately separated and clamped sync signal, minus high and low frequency hum which may have been on the input video, is buffered by transistor 604 and exits the circuit at terminal 110.

Figure 6:
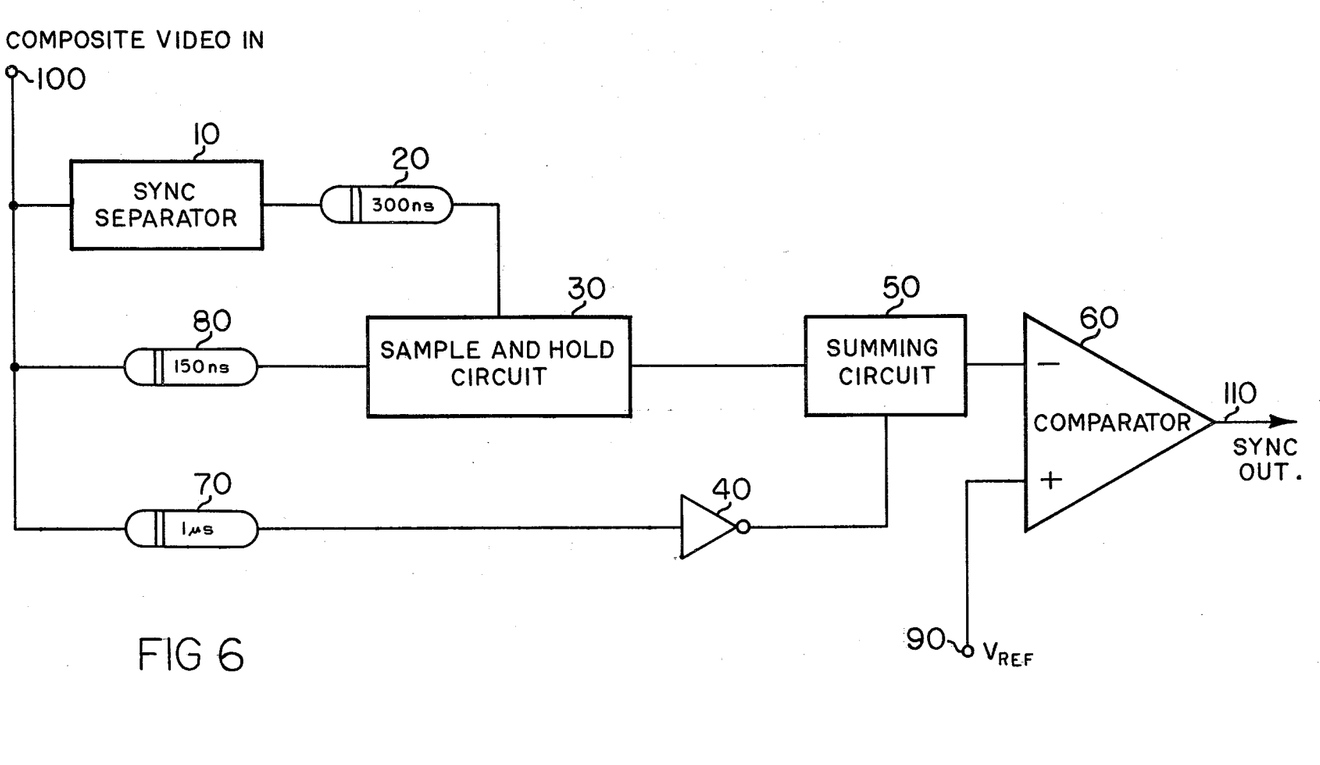
FIG. 6 is a block diagram of an alternate embodiment of the present invention.

Referring now to FIG. 6, there is illustrated an alternative embodiment of the present invention. It can be seen that this embodiment departs from that of FIG. 1 merely by the location of inverter 40 which is now positioned between delay 70 and summing circuit 50. This embodiment operates in the same manner as that described above for the previous embodiment. The only difference being that the signal inversion is in the video signal path rather than the sample pulse path. The resulting output of summing circuit 50 is identical to that obtained in the circuit of FIG. 1. Inversion must take place in one of the signal paths.

While there has been described several preferred embodiments of the present invention, it will be apparent to those skilled in the art that many other changes may be made without departing from the broader aspects of my invention. Therefore, the appended claims are intended to cover all such changes and modifications which might be made by a person skilled in the art.

I claim the following as my invention:

1. A sync separator comprising:
   first means for separating a sync signal from an input composite video signal;
   first means for receiving and delaying said input composite video signal;
   a sample-and-hold circuit coupled to said first separating means and said first receiving and delaying means, the output of said sample-and-hold circuit being a sample of said delayed composite video signal;
   second means for receiving and delaying said input composite video signal coupled to a summing point;
   an inverter coupled to receive and invert said sample, the output of said inverter being coupled to said summing point; and
   second means for separating a sync signal coupled to receive the output of said summing point.

2. The sync separator according to claim 1 wherein said summing point and said inverter comprise a differential amplifier.

3. The sync separator according to claim 1 wherein said first receiving and delaying means comprises a 150-nanosecond delay line.

4. The sync separator according to claim 1 wherein said second receiving and delaying means comprises a 1-microsecond delay line.

5. The sync separator according to claim 1 further comprising a third means for receiving and delaying coupled between said first sync separating means and said sample-and-hold circuit for delaying the leading edge of the output of said first sync separating means.

6. The sync separator according to claim 5 wherein said third receiving and delaying means comprises a 300-nanosecond delay line.

7. The sync separator according to claim 1 wherein said second separating means comprises a comparator for comparing the level of the sync pulse to an external reference voltage.

8. A sync separator comprising:
   first means for separting a sync signal from an input composite video signal;
   first means for receiving and delaying said input composite video signal;
   a sample-and-hold circuit coupled to said first separating means and first receiving and delaying means, the output of said sample-and-hold circuit being a sample of said delayed composite video signal;
   second means for receiving and delaying said input composite video signal coupled to a summing point;
   an inverter coupled between said second receiving and delaying means and said summing point for inverting said input composite video signal; and
   second means for separating a sync signal coupled to receive the output of said summing point.

9. The sync separator according to claim 8 wherein said second separating meas comprises a comparator for comparing the level of the separated sync signal to an external reference.

10. The sync separator according to claim 8 wherein said summing point and said inverter comprise a differential amplifier.

11. The sync separator according to claim 8 wherein said first receiving and delaying means comprises a 150-nanosecond delay line.

12. The sync separator according to claim 8 wherein said second receiving and delaying means comprises a 1-microsecond delay line.

13. The sync separator according to claim 8 further comprising a third means for receiving and delaying coupled between said first sync separating means and said sample-and-hold circuit for delaying the leading edge of the output of said first sync separating means.

14. The sync separator according to claim 13 wherein said third receiving and delaying means comprises a 300-nanosecond delay line.

15. A method for accurately separating a synchronizing signal from a composite video signal, comprising the steps of:
   (a) separating the synchronizing signal from the output signal to derive a sampling pulse;
   (b) utilizing said sampling pulse in a sample-and-hold circuit to obtain a sample of the input composite video signal;
   (c) delaying the input composite video signal;
   (d) inverting the output of said sample-and-hold circuit and combining it at a summing point with said delayed input composite video signal to produce a clamp null during the front porch of the horizontal interval of said input composite video signal; and
   (e) separating the synchronizing signal from the output of said summing point.

16. A sync separator comprising:
   first means for separating a sync signal from an input composite video signal;
   a sample-and-hold circuit coupled to receive the output of said first separating means and to also receive said input composite video signal, the output of said sample-and-hold circuit being a sample of said input composite video signal;
   means for receiving and delaying said input composite video signal coupled to a summing point;
   an inverter coupled to receive and invert said sample, the output of said inverter being coupled to said summing point; and
   second means for seprating a sync signal coupled to receive the output of said summing point.

17. A sync separator according to claim 16 wherein said summing point and said inverter comprise a differential amplifier.

18. The sync separator according to claim 16 wherein said receiving and delaying means comprises a 1-microsecond delay line.

19. The sync separator according to claim 16 wherein said second separating means comprises a comparator for comparing the level of the sync pulse to an external reference voltage.

20. A sync separator comprising:
   first means for separating a sync signal from an input composite video signal;
   a sample-and-hold circuit coupled to receive the output of said first separating means and to also receive said input composite video signal, the output of said sample-and-hold circuit being a sample of said input composite video signal;
   means for receiving and delaying said input composite video signal coupled to a summing point;
   an inverter coupled between said receiving and delaying means and said summing point for inverting said input composite video signal; and
   second means for separating a sync signal coupled to receive the output of said summing point.

21. The sync separator according to claim 20 wherein said second separating means comprises a comparator for comparing the level of the separated sync signal to an external reference.

22. The sync separator according to claim 20 wherein said summing point and said inverter comprise a differential amplifier.

23. The sync separator according to claim 20 wherein said means for receiving and delaying comprises a 1-microsecond delay line.

* * * * *

UNITED STATES PATENT AND TRADEMARK OFFICE
CERTIFICATE OF CORRECTION

PATENT NO. : 4,233,629

DATED : November 11, 1980

INVENTOR(S) : Birney D. Dayton

It is certified that error appears in the above-identified patent and that said Letters Patent are hereby corrected as shown below:

Col. 1, line 14, reads "employed a clip the sync" it should read --employed to clip the sync--.

Col. 1, line 21, reads "described a sync separator" it should read --describes a sync separator--.

Col. 2, line 30, reads "comparator or line 110" it should read --comparator on line 110--.

Col. 3, line 52, reads "poetntiometer" it should read --potentiometer--.

Col. 5, line 60, reads "meas" it should read --means--.

Col. 6, line 42, reads "seprating" it should read --separating--.

Signed and Sealed this

Seventeenth Day of March 1981

[SEAL]

Attest:

RENE D. TEGTMEYER

Attesting Officer

Acting Commissioner of Patents and Trademarks